United States Patent Office 3,480,530
Patented Nov. 25, 1969

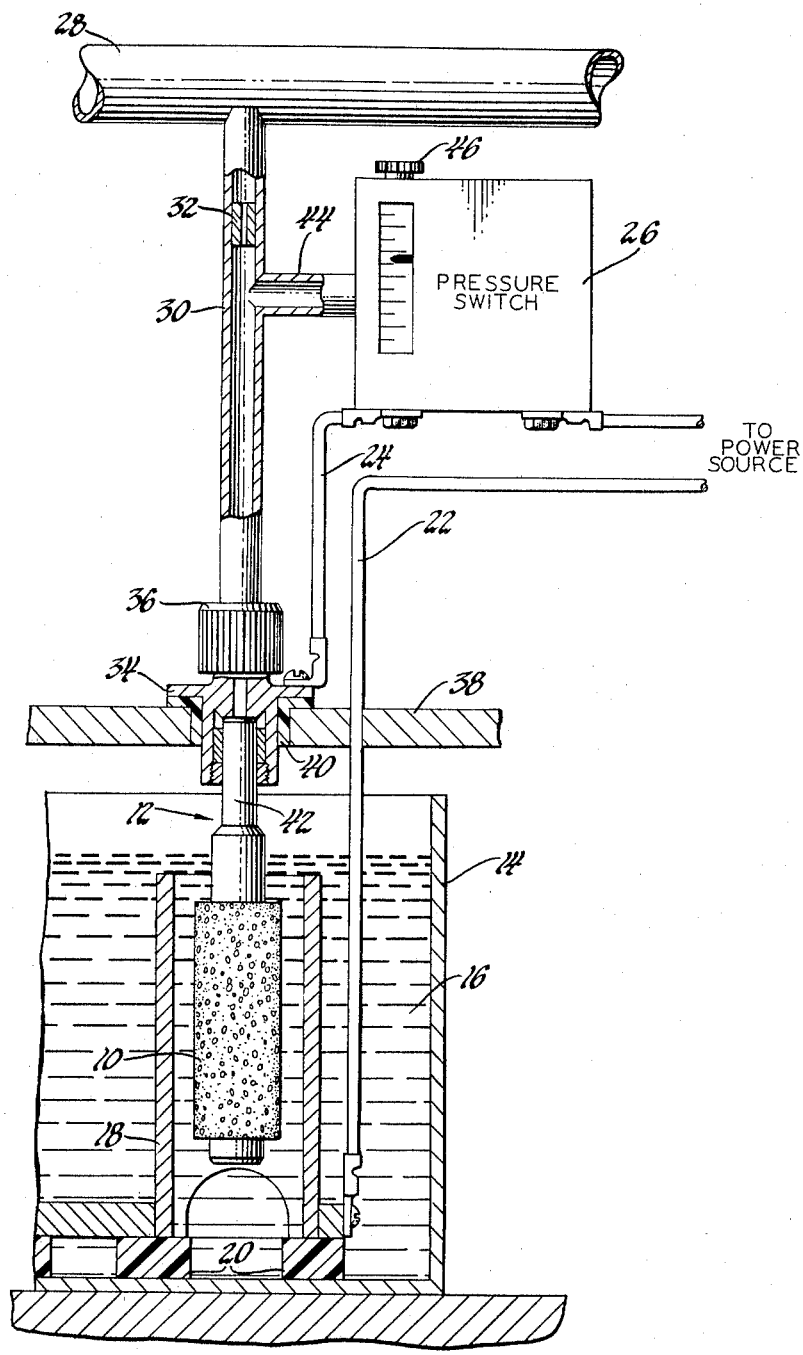

3,480,530
METHOD FOR PRODUCING POROUS METAL PARTS HAVING UNIFORM FLUID PERMEABILITY
Donald A. Voorhies, West Hartford, Conn., assignor to General Motors Corporation, Detroit, Mich., a corporation of Delaware
Filed Nov. 15, 1966, Ser. No. 594,480
Int. Cl. B23p *1/00;* B22f *3/24*
U.S. Cl. 204—141                                    5 Claims

ABSTRACT OF THE DISCLOSURE

Precise control over the permeability of a porous metal part is accomplished by monitoring the flow rate of the air through the part during electrolytic erosion of metal from the surface pores. The electrolytic erosion is automatically discontinued when the back pressure of the air falls below a predetermined value.

---

This invention relates to the production of porous metal parts such as fluid bearing bushings and, more particularly, to a method of imparting a desired permeability to a part following a machining process.

Porous metal parts, such as bushings for air bearings, are usually produced by compacting, sintering and sizing powdered metals into the desired shape. The dimensional accuracy of porous metal parts so produced is not sufficient for many uses. Therefore it is often desirable or necessary to machine, i.e., grind or ream, a surface of the part. This machining tends to fill the surface pores with metal thus closing the pores and materially reducing the fluid permeability of the part.

In accordance with the subject invention, precise control over the permeability of a porous metal part may be accomplished in such a fashion that the permeability of the part may be increased to a desired value following a process such as machining which closes surface pores. In general, this is accomplished by electrolytically eroding metal from the surface pores while applying air or other fluid under pressure to the part. An indication that the desired permeability has been reached may be accomplished by monitoring the rate of fluid flow through the porous part. When the desired permeability is reached, the electrolytic erosion is abruptly discontinued leaving the part in the desired state.

It is to be understood that while the subject invention is especially useful in restoring permeability decreased by surface machining, it is applicable to all situations wherein it is desired to increase the permeability of a porous metal part by electrolytically eroding metal from a surface thereof.

A method consonant with the invention as well as apparatus for carrying out the method is specifically described in the following text with reference to the drawing of which the single figure illustrates the apparatus.

Referring to the figure, which will serve to illustrate an application of the invention, 10 is a cylindrical porous metal bushing. The outer surface of bushing 10 has been machined by grinding or reaming to a desired dimension. In the process of grinding the bushing 10, the pores on the outer cylindrical surface have been filled with metal thereby reducing the permeability of the bushing to an undesirably low value. Before the bushing 10 can be used in an air bearing, it is thus necessary to improve the permeability thereof by removing the metal from the surface pores.

To accomplish this in accordance with the invention, the bushing 10 is mounted on a conductive support means generally designated at 12 and disposed within a container 14 which is substantially filled with an electrolyte 16. A hollow cylindrical electrode is disposed within the container 14 to surround the bushing 10 in radially spaced relationship therewith. The electrolyte completely covers both the bushing 10 and the electrode 18. Electrode 18 sits on an annular insulator 20.

Energization of the electrolytic erosion circuit is accomplished by conductors 22 and 24 which are connected to a power source indicated by legend. Conductor 22 is connected to the cylindrical insulator 18. Conductor 24 is electrically connected to the support means 12. The conductive path from the source to the support 12, however, includes in series relationship therewith a normally closed pressure switch 26, the function of which is described in further detail below.

Assuming the switch 26 to be closed, current passes through the switch 26, the conductor 24, the support means 12, the bushing 10, electrolyte 16, electrode 18, and conductor 22 back to the source. Bushing 10 which thus constitutes the anode in the DC circuit just described is electrolytically eroded so that the metal which closes the surface pores due to the machining process is gradually removed. An electrolyte 16 which has no strong chemical reaction with the metal bushing 10 is preferred.

For the purpose of ascertaining the point in time in which the permeability of bushing 10 has increased to the desired value, a suitable fluid such as air is admitted under pressure to the surface of an inner bore of the bushing 10. The air is supplied by a main supply duct 28 and a branch duct 30 which contains a restrictive 32. Duct 30 is connected to a chuck assembly which includes a conductive body member 34 and a threaded clamp 36. Body member 34 is fastened to a support board 38 by means of a flared annular insulator 40 and is fitted to receive a conductive pipe 42 which forms part of the bushing support assembly 12. The conductive pipe 42 is inserted into the inner bore of bushing 10 so as to sealingly engage the inner surface of the bushing. Pipe 42 is provided with openings not shown which permit air to be supplied substantially uniformally to the inner surface of bushing 10. This air passes through the bushing 10 due to the porosity thereof and escapes through the electrolyte 16.

As described above, the machining process previously performed on the outer surface of the cylindrical bushing 10 tends to close the surface pores thereof. Therefore, the permeability of the bushing 10 is reduced and the air which is permitted to flow through the bushing 10 is substantially reduced, if not completely cut off. Since the bushing 10 is contemplated for use in a combination such as an air bearing where a predetermined permeability is necessary, the aforementioned electrolytic erosion process is carried out to improve or increase the permeability of bushing 10. The desired permeability is indicated as a function of flow rate of the presurized air through the porous bushing 10. To monitor this flow rate, the branch duct 30 is connected by means of a section 44 to the pressure sensitive switch 26. The switch 26, which is normally closed, may be adjusted by means indicated at 46 to open whenever the air pressure exerted upon a diaphragm member (not shown) falls below a predetermined value. As the electrolytic erosion process continues, the flow rate of air through bushing 10 rises, thus decreasing the back pressure in branch duct 30. When the desired bushing permeability is attained, switch 26 opens, cutting off the flow of electric current in the electrolytic erosion circuit. Opening the current supply circuit abruptly terminates the erosion process, leaving the bushing 10 in the desired state of permeability.

As previously mentioned, the utility of the method described is not limited to porous metal parts the permeability of which has been reduced by a machining process. The invention may be advantageously applied to increasing the permeability of any porous metal part by enlarging the pores in the part adjacent the surface thereof. Similarly, the process described above may be applied to porous parts of various geometries by suitable adjustment of the air inlet pipe 42 and the electrode 18. Therefore, this description is not to be construed in a limiting sense. For a definition of the invention, reference should be had to the appended claims.

What is claimed is:

1. A method of increasing the permeability of a porous metal part comprising the steps of electrolytically eroding metal from the pores in at least one surface of the part, simultaneously applying fluid under pressure to another surface of the part, monitoring the flow rate of the fluid applied to the part during the electrolytic erosion, and discontinuing the erosion when the desired flow rate is reached.

2. The method defined in claim 1 wherein the electrolytic erosion is accomplished by immersing the part in an electrolyte and causing electric current to flow between the part and an electrode adjacent but spaced from said one surface of the part.

3. The method defined in claim 2 wherein the step of discontinuing is accomplished by terminating said flow of electric current whenever a desired flow rate is reached.

4. The method defined in claim 1 wherein the fluid is air.

5. The method defined in claim 1 wherein said monitoring the flow rate is accomplished by measuring the back pressure exerted by the fluid as a result of restricted flow through the porous part.

References Cited

UNITED STATES PATENTS 3,220,937  11/1965  Friese et al. _____ 204—284

OTHER REFERENCES

Max Knobel: A Porous Electrode for Oxidations or Reductions, Industrial and Engineering Chemistry, vol. 17, No. 8, p. 826. (August 1925).

JOHN H. MACK, Primary Examiner

SIDNEY S. KANTER, Assistant Examiner

U.S. Cl. X.R.

204—229